June 17, 1924.
W. F. GROENE
1,498,513
FACING ATTACHMENT FOR LATHES
Filed Jan. 12, 1923
3 Sheets-Sheet 2
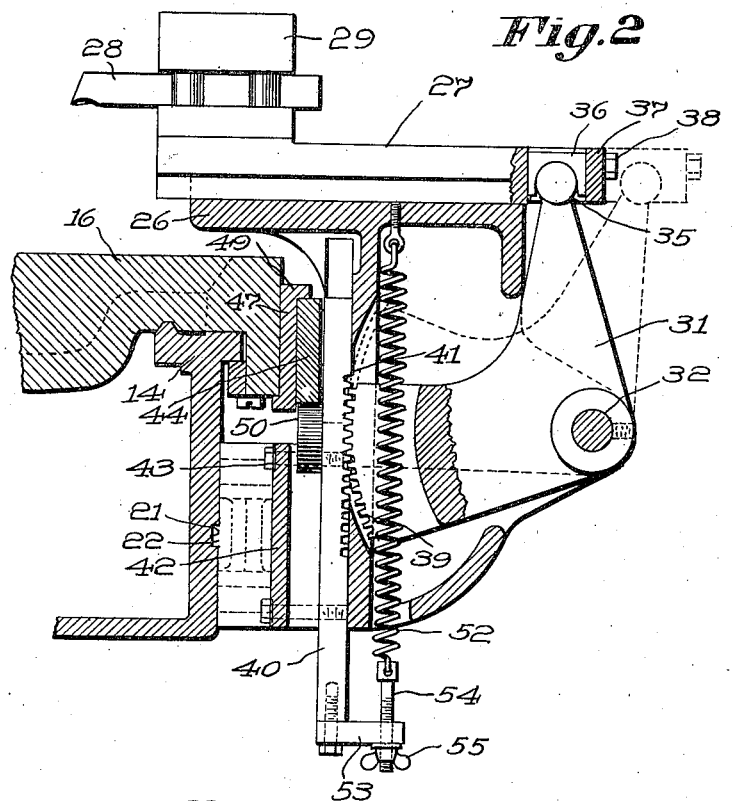
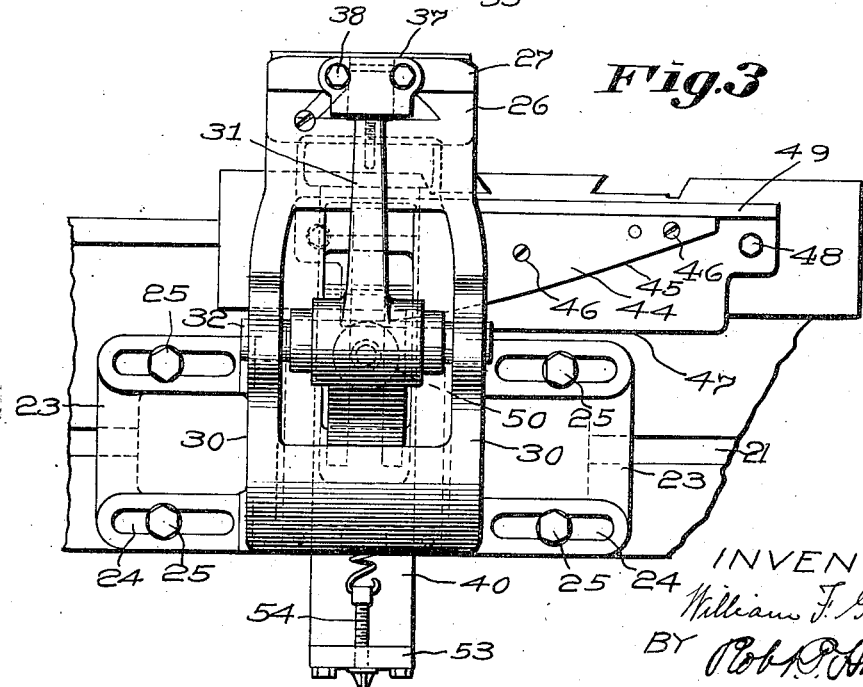
INVENTOR:
William F. Groene
BY Rob. P. Harris
ATTORNEY June 17, 1924.  
W. F. GROENE  
FACING ATTACHMENT FOR LATHES  
Filed Jan. 12, 1923  
1,498,513  
3 Sheets-Sheet 3
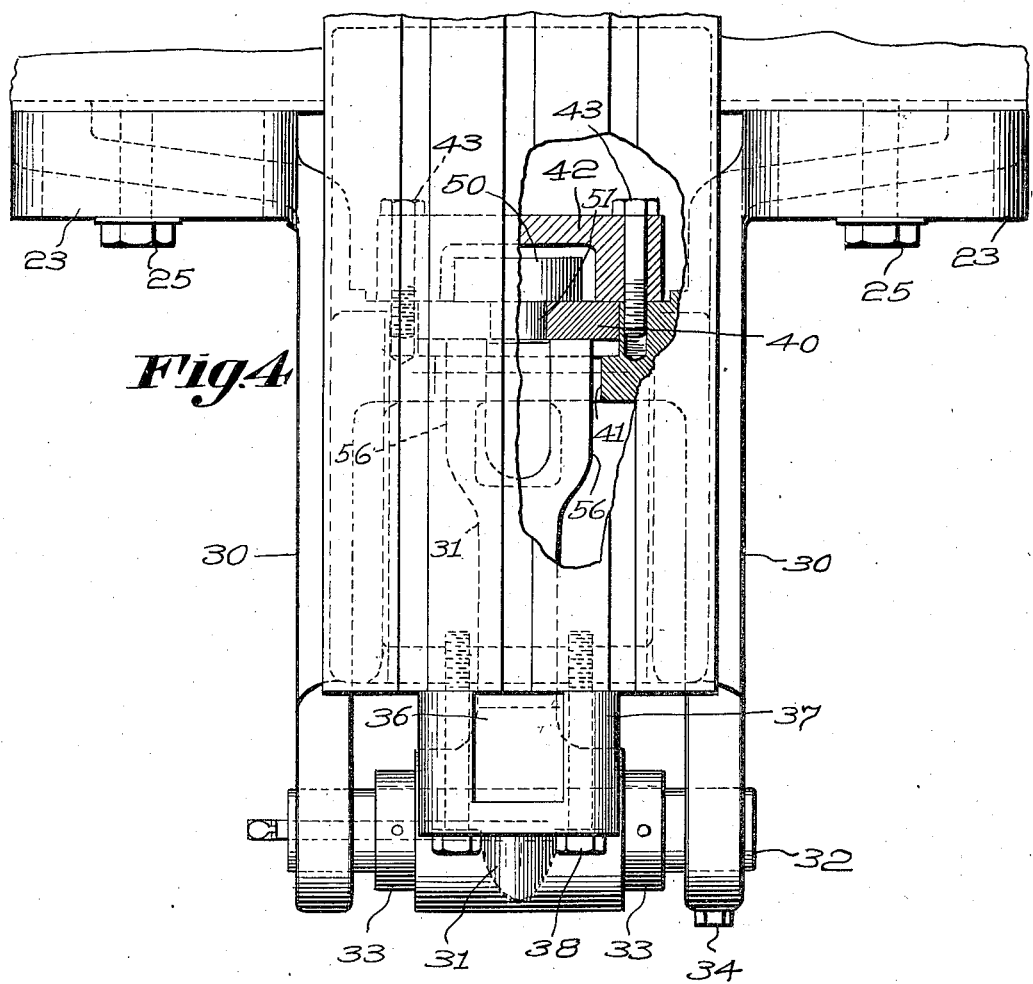
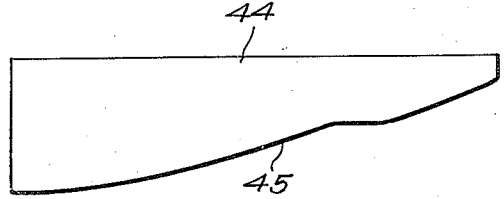

Patented June 17, 1924.

1,498,513

UNITED STATES PATENT OFFICE.

WILLIAM F. GROENE, OF CINCINNATI, OHIO, ASSIGNOR TO THE R. K. LE BLOND MACHINE TOOL COMPANY, OF CINCINNATI, OHIO, A CORPORATION OF DELAWARE.

FACING ATTACHMENT FOR LATHES.

Application filed January 12, 1923. Serial No. 612,312.

*To all whom it may concern:*

Be it known that I, WILLIAM F. GROENE, a citizen of the United States, residing in Cincinnati, county of Hamilton, and State of Ohio, have invented an Improvement in Facing Attachments for Lathes, of which the following description, in connection with the accompanying drawings, is a specification, like characters on the drawings representing like parts.

This invention relates to improvements in facing attachments for lathes.

In certain lathe operations it may be desirable to advance a tool longitudinally of the lathe to perform the usual turning operation, and at the same time feed a second tool transversely of the lathe to perform a facing or grooving operation.

It is often desirable that the transversely operating tool be actuated in timed relation with the tool that travels longitudinally of the lathe, and the present invention relates to novel means for imparting movement from the lathe carriage to the transversely operating tool to feed the latter crosswise of the lathe as the carriage travels along the lathe bed.

One important feature of the present invention resides in simple means including a rocking lever for imparting movement to the transversely operating tool as the carriage travels along the lathe, and another feature of the invention resides in a profile bar the active face of which may have its contour varied as desired to vary the rate at which the transverse tool will be fed toward the work by movement of the carriage along its bed.

Other features of the invention and novel combination of parts in addition to the above will be hereinafter described in connection with the accompanying drawings which illustrate a good practical form of the invention.

In the drawings:

Fig. 2 is a vertical sectional view taken transversely through the rear side of the lathe and through the facing attachment secured thereto.

Fig. 3 is a rear elevation of Fig. 2.

Fig. 4 is an enlarged plan view of parts shown in Fig. 2; and

Fig. 5 is a side view of a profile bar to be described.

Figure 1:
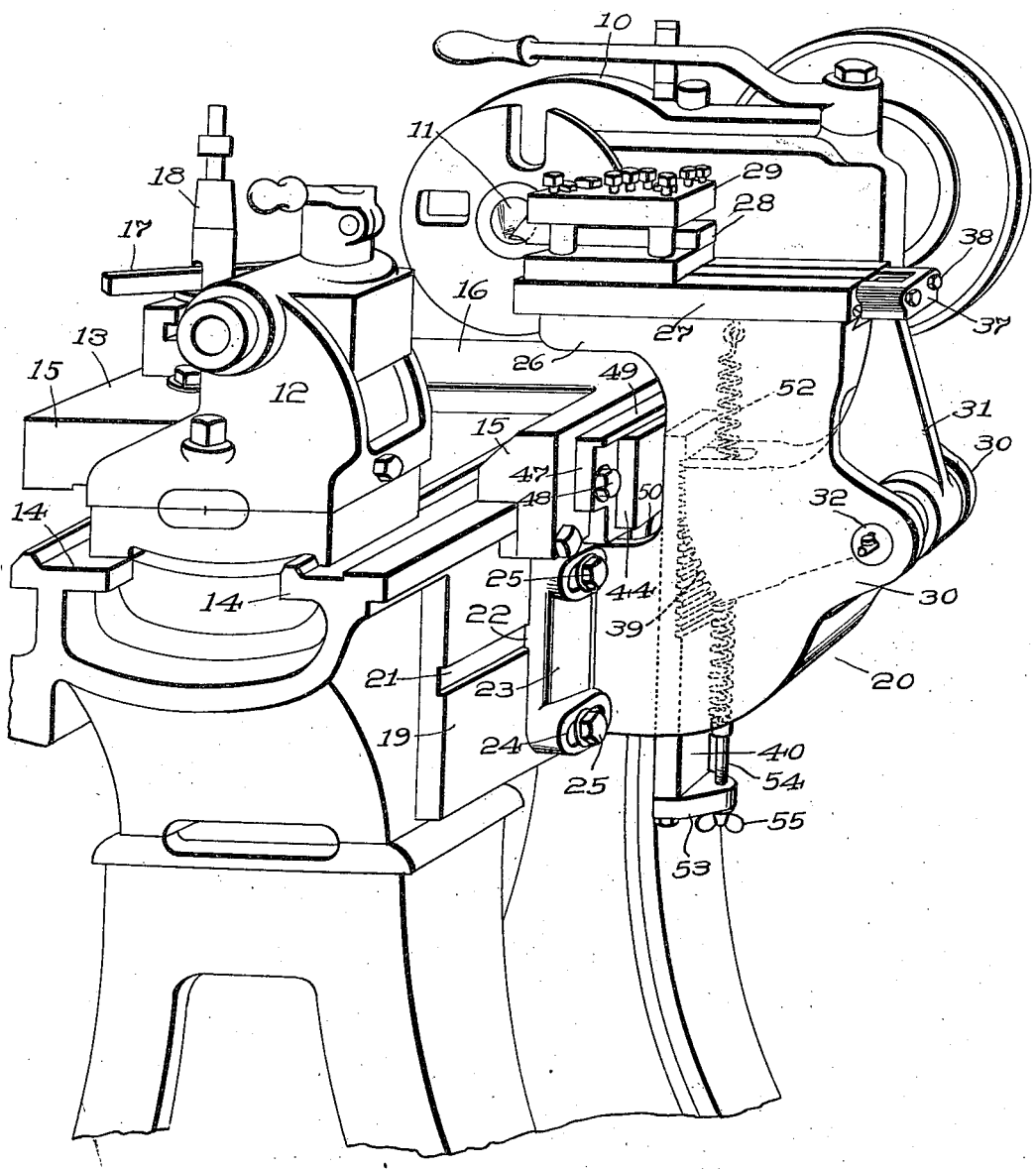
Fig. 1 is a perspective view of a lathe viewed from the rear side thereof and having a facing attachment embodying the present invention applied thereto.

The lathe shown in Fig. 1, for the most part may be of any usual or preferred construction and has a head 10 provided with a live spindle 11, and a tail stock 12 provided with the usual dead spindle. The tool carriage 13 is mounted for sliding movement lengthwise of the lathe upon the bed 14, and this carriage is shown as consisting of the usual side portions 15 connected by a bridge portion 16, and the turning tool 17 is supported upon the carriage by the tool post 18.

The lathe shown is provided with a plate 19 extending lengthwise of the rear side of the lathe and to this plate is secured a bracket 20. The plate 19 preferably has a groove 21 adapted to receive a key or keys 22 upon the bracket 20 and which extend into the groove 21. The bracket 20 has laterally extending flanges 23 through which are formed elongated slots 24 adapted to receive bolts 25. The arrangement is such that the bracket 20 may be adjusted lengthwise of the plate 19 and may be clamped in the desired position of adjustment by tightening the bolts 25.

The bracket 20 supports the transversely operating tool independently of the carriage 13, and in the construction shown the bracket is provided with a head 26 upon which a tool carrier 27 is mounted for sliding movement transversely of the lathe toward and from the axis of the lathe centres. The carrier 27 may have a dove-tail engagement with the head 26 as shown, and the transversely operating tool or tools 28 may be clamped in a tool holder 29 upon the carrier 27.

As stated, the present invention relates to novel means for effecting movement of the carrier 27 transversely of the lathe upon movement of the carriage 13 along the bed, and mechanism to this end will now be described. The bracket 20 preferably is provided with spaced upstanding walls 30 between which is mounted a rocking lever 31. This lever may be rockingly supported by a shaft 32 extending through the spaced walls 30 and through the lever, and collars 33 rigidly secured to the shaft 32 upon each side of the lever prevent the latter from moving lengthwise of the shaft, and bolts 34 may be provided to secure the shaft rigidly within the walls 30.

The lever 31 is shown as having a laterally extending arm and an upwardly extending arm, and the latter arm is operatively connected to the tool carrier 27 so that sliding movement will be imparted to the carrier when the lever is rocked. In the construction shown the upwardly extending arm of the lever 31 has a rounded end 35 upon which is seated a shoe 36, and this shoe is mounted within a hollow bracket 37 secured by bolts 38 to the rear end of the carrier 27. The bracket 37 embraces the shoe snugly but allows the shoe to rise and fall slightly as the lever rocks about its supporting shaft.

The laterally extending arm of the lever 31 is provided with teeth 39 adapted to mesh with the teeth of a rack 40, which rack may be mounted upon the bracket 20 for vertical sliding movement. The rack 40, as will be apparent from Fig. 4, slides in the space between the lugs 41 which engage the face of the rack upon which the teeth are formed and the clamp 42 which engages the opposite face of the rack. The clamp 42 may be U-shaped in cross section as shown and is secured to the bracket 20 by bolts 43.

Sliding movement is imparted to the rack 40 upon movement of the carriage 13 along the lathe bed, and in the present construction this is accomplished by securing a member having a cam face to the carriage in position to actuate the rack. This cam member preferably comprises a profile bar 44 having a curved face 45 the curvature of which may be varied as desired, and the profile bar may be secured by bolts 46 to a plate 47 fastened to the rear face of the carriage 13 by bolts 48. The plate 47 may have a flange 49 against which the upper edge of the profile bar 44 rests. A roller 50 secured by a stud 51 to the rack 40 is engaged and actuated by the curved face 45 of the profile bar, and the arrangement is such that as the carriage 13 is moved toward the head of the lathe the curved face of the profile bar will force the roller 50 and rack downward. This will rock the lever 31 in a direction to move the tool carrier 27 inwardly toward the work.

Yielding means may be provided for moving the tool carrier 27 outwardly as the carriage 13 is moved away from the lathe head. The yielding means may be given various forms but in the construction shown comprises a coiled spring 52 extending lengthwise of the rack 40 and the upper end of this spring is secured to the bracket head 26 between the spaced wall, while the lower end of the spring is secured to a plate 53 bolted to the lower end of the rack. The tension of the spring 52 may be varied by a bolt 54 secured to the plate 53 by a wing nut 55. The spring 52 preferably extends between the rack 40 and the lever 31 as shown, and the laterally extending arm of the lever is therefore bifurcated so that the spring may extend between the spaced portions 56 of this lever, and the teeth 39 are formed in each of the bifurcated portions 56. This arrangement of the spring 52 exerts a direct upward pull upon the rack at a point which is best adapted to actuate the lever 31, and the spring holds the roller 50 in contact with the active face of the profile bar.

It may be desirable to vary the rate at which the carrier 27 is fed inwardly while the carriage is advanced along its bed at a uniform rate of speed. This may be accomplished by varying the contour of the active face of the profile bar and the face of this bar may be given a gradual curve as shown in Fig. 3, or this face may have a flattened portion as shown in Fig. 5, so that the transverse feed will slow down or stop entirely as the roller 50 engages the flattened portion.

What is claimed is:

1. In a lathe, the combination of the bed, a tool supporting carriage movable longitudinally of the bed, a facing tool carrier mounted independent of the carriage for movement transversely of the lathe, a profile bar connected to the carriage for movement therewith and having its under surface provided with a profile to determine the movement of the facing tool carrier transversely of the lathe, a lever fulcrumed independent of both the carrier and carriage and having an arm operatively connected to the carrier, a rack mounted independent of the carriage for vertical sliding movement and positioned to be operated by the profile of said under face as the carriage is moved along its bed, and teeth upon the lever engaging the rack to cause the rack to impart rocking movement to the lever.

2. In a lathe, the combination of the bed, a tool supporting carriage movable longitudinally of the bed, a bracket supported independently of the carriage, a tool carrier mounted on the bracket for movement transversely of the lathe, a rocking lever pivotally mounted upon the bracket and having one arm operatively connected to the carrier, a profile bar secured to the carriage, a rack mounted for vertical sliding movement and having a portion that engages and is actuated by the profile bar as the carriage is moved along its bed, yielding means acting upon said rack to hold it in operative engagement with the profile bar, and teeth upon an arm of the lever and meshing with the teeth of the rack to impart movement from the rack to the lever.

3. In a lathe, the combination of the bed, a tool supporting carriage movable longitudinally of the bed, a facing tool carrier mounted independently of the carriage for movement transversely of the lathe, a profile bar connected to the carriage for movement therewith, a lever fulcrumed independent of both the carrier and carriage and having one arm operatively connected to the carrier, a rack mounted independent of the carriage for vertical sliding movement and positioned to be operated by the profile bar as the carriage is moved along its bed, and teeth upon the lever and engaging the rack to transmit movement of the rack to the lever.

4. In a lathe, the combination of the bed, a tool supporting carriage movable longitudinally of the bed, a facing tool carrier mounted independently of the carriage for movement transversely of the lathe, a profile bar connected to the carriage for movement therewith, a lever fulcrumed independent of both the carrier and the carriage and having one arm operatively connected to the carrier, a rack mounted independent of the carriage for vertical sliding movement and provided with a portion that engages the profile bar to slide the rack as the carriage is moved along its bed, a spring extending longitudinally of the rack and operable to hold said portion of the rack against the operating face of the profile bar, and the lever having a laterally extending arm that is bifurcated to straddle said spring and having teeth that mesh with the teeth of the rack to impart movement from the rack to the lever.

5. In a lathe, the combination of the bed, a tool supporting carriage movable longitudinally on the bed, a bracket supported independently of the carriage, a tool carrier mounted on the bracket for movement transversely of the lathe, a rocking lever for feeding the tool carrier transversely of the lathe and having a bifurcated end portion with teeth upon said end, a rack meshing with said teeth and actuated by movement of the carriage along the bed to operate said lever, and a spring extending along said rack through the bifurcated portion of said lever and connected to the rack to urge the latter in one direction.

6. In a lathe, the combination of the bed, a tool supporting carriage movable longitudinally on the bed, a bracket supported independently of the carriage, a tool carrier mounted on the bracket for movement transversely of the lathe, a rocking lever for feeding the tool carrier transversely of the lathe, a connection between the lever and tool carrier including a rounded end upon the lever and a shoe seated on said rounded end and movably secured to the tool carrier, and means for causing movement of the carriage along its bed to rock said lever.

7. In a lathe, the combination of the bed, a tool supporting carriage movable longitudinally of the bed, a bracket supported independently of the carriage, a tool carrier mounted on the bracket for movement transversely of the lathe, a rocking lever pivotally mounted upon the bracket and having one arm operatively connected to the carriage, a profile bar secured to a vertical rear face of the carriage, a rack supported by the bracket for vertical sliding movement and having a portion that engages the profile bar to actuate the lever as the carriage is moved along its bed, yielding means for holding said portion of the rack against the profile bar, and teeth upon an arm of said lever and meshing with the rack to actuate the lever from the rack.

In testimony whereof, I have signed my name to this specification.

WILLIAM F. GROENE.